Figure 1:
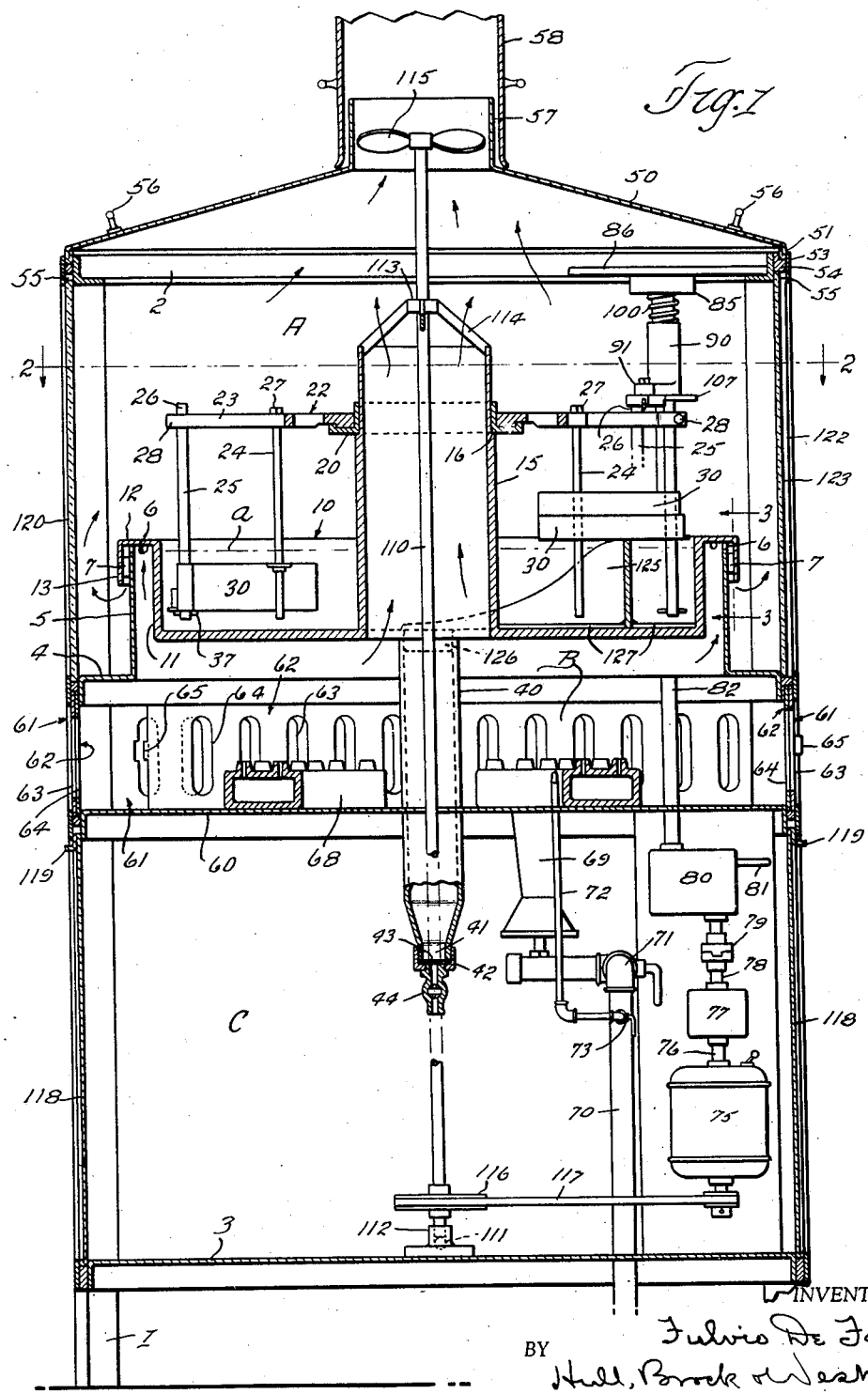

Feb. 14, 1939.  F. DE FAZI  2,147,335
FOOD COOKING OR FRYING MACHINE
Filed Aug. 13, 1937  3 Sheets-Sheet 1

INVENTOR.
Fulvio De Fazi
BY
Hull, Brock & West
ATTORNEYS

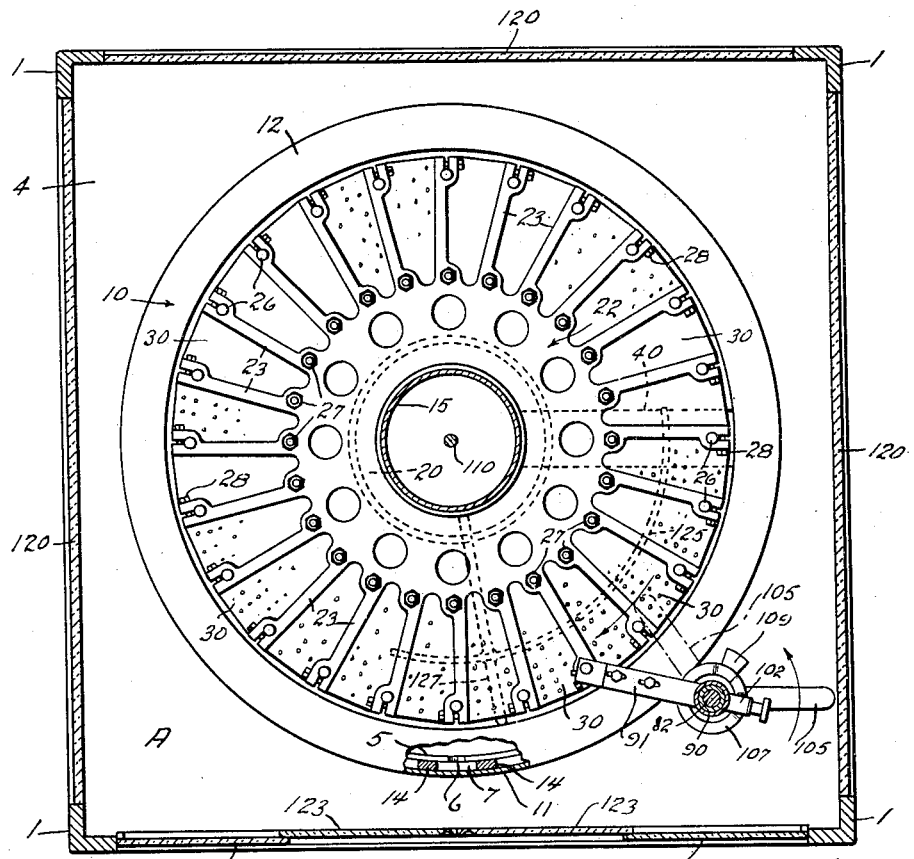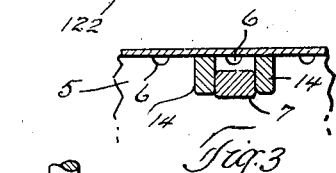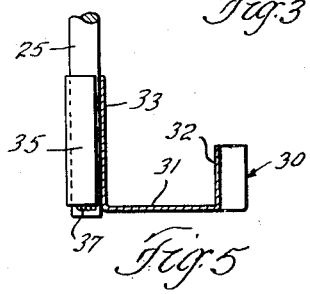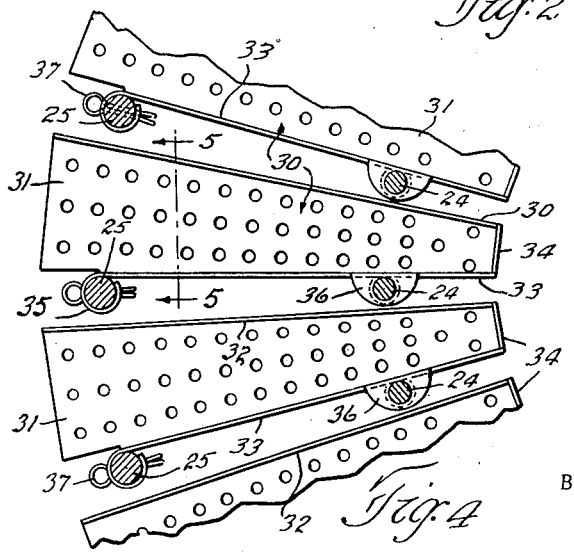

Feb. 14, 1939.　　　　F. DE FAZI　　　　2,147,335
FOOD COOKING OR FRYING MACHINE
Filed Aug. 13, 1937　　　3 Sheets-Sheet 3
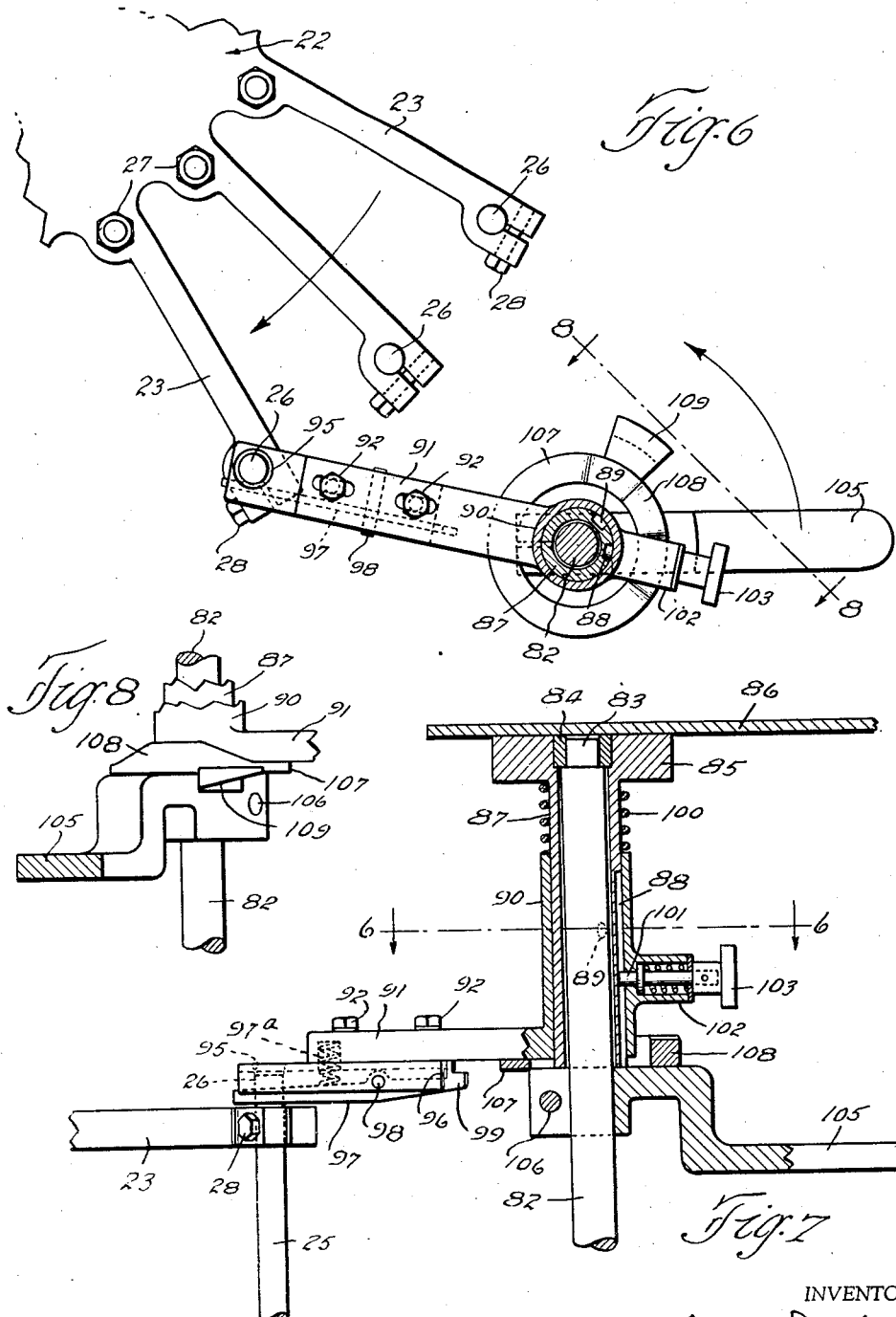
INVENTOR.
Fulvio De Fazi
BY
Hull, Brock & West
ATTORNEYS.

Patented Feb. 14, 1939

2,147,335

UNITED STATES PATENT OFFICE 2,147,335

FOOD COOKING OR FRYING MACHINE

Fulvio De Fazi, Cleveland, Ohio

Application August 13, 1937, Serial No. 158,930

23 Claims. (Cl. 53—5)

This invention relates to improvements in that class of machines used for cooking food by the deep fat frying process; and one of the several objects is the production of a machine of this class that is adapted for the cooking of various kinds of foods requiring different lengths of time for their cooking, such, for example, as chicken, fish, meats, vegetables and dough products.

Another object of the invention is to effectively ventilate a machine of this character by providing forced draft means for carrying off the cooking fumes, as well as the products of combustion in case the machine is heated by a combustion device, and expelling them through a flue.

Another object of the invention is to provide the frying pan with a sump in which loose articles of food or food particles, accidentally dropped into the pan or dislodged from the food carriers, are automatically deposited and there retained out of the highly heated cooking zone so as to avoid contamination of the frying liquor by the presence therein of overcooked or burnt food, the sump desirably having a capped or valved outlet, thereby to serve as a drain for the pan.

Another object of the invention is to provide a construction that facilitates the cleaning of the machine, certain parts that contact the frying liquor and other elements associated with such parts being readily removable.

Further and more general objects are the attainment of simplicity of construction, economy of production, convenience of use, ready accessibility of controls and adjustments, immunity from disorder, compactness, reliability and durability in machines of the class to which the invention pertains; and the foregoing objects, with others hereinafter appearing, are realized in the embodiment of the invention illustrated in the accompanying drawings wherein Fig. 1 is a sectional side elevation of the machine, the front which marks the operator's position being at the right of this view, and the guide rods and food carriers beyond the plane of section being omitted to avoid confusion; Fig. 2 is a sectional plan on the line 2—2 of Fig. 1, the front of the machine being shown at the bottom of this view; Fig. 3 is a sectional detail on the line 3—3 of Fig. 1; Fig. 4 shows some of the food carriers in plan and the guide rods by which they are carried in section; Fig. 5 is a section on the line 5—5 of Fig. 4; Fig. 6 is a detail in plan embracing a part of the conveyor or spider by which the food carriers are sustained and the means for imparting thereto a step-by-step movement and for stopping and locking the conveyor or spider after it has been moved, this view being, in effect, an enlarged fragmentary section on the line 2—2 of Fig. 1; Fig. 7 is a side elevation, partly in section, of what is shown in Fig. 6 as observed from the bottom of the latter view; and Fig. 8 is a further detail of certain of the parts shown in Fig. 6, the picture plane of the present view being indicated by the line 8—8 of Fig. 6.

The frame of the machine includes four corner posts, each designated 1, and these posts are rigidly secured at their upper ends to the corners of a rectangular or square frame 2. The corner posts and frames desirably consist of angle irons. Supported by the corner posts a suitable distance above the floor is a bottom plate or base 3, and at a convenient elevation thereabove, say about waist-high to an operator as he stands on the floor, is a top plate or table 4 that is provided with a large circular central opening surrounded by an upstanding cylindrical wall 5. The corners of the plates 3 and 4 may be secured in the angles of the posts 1 in any approved manner to insure rigidity to the structure. Vent openings 6 are formed in the upper edge portion of the wall 5, and at suitable locations about the outside of said wall and near the top thereof are locating blocks 7.

10 designates the pan that contains the molten fat or frying liquor within which the food is cooked. It is of annular form, and extending outwardly from the top of its peripheral wall 11 is a ledge 12 that rests on the upper edge of the cylindrical wall 5. A flange 13 depends from the outer edge of the ledge 12 in spaced relation to the wall 5 and on its inner side is provided with a plurality of pairs of spaced lugs 14 (Figs. 2 and 3) that are arranged to cooperate with the positioning blocks 7 for properly locating the pan with respect to the top plate 4. The pan is provided with a central flue 15 that extends a substantial distance above the top plane of the pan and on its exterior is formed with a shoulder 16 that is spaced a suitable distance below the upper end of the flue.

An annular bearing 20 surrounds the flue and rests upon the shoulder 16, and rotatably supported by said bearing is a conveyor or spider 22 that incorporates a series of radial arms 23. Depending from each arm 23 is an inner guide rod 24 and an outer guide rod 25, the latter projecting a slight distance above the arm to provide a stud 26. The guide rods 24 may be threaded at their upper ends and screwed through tapped holes in the arms 23 a sufficient distance to permit application thereto of nuts 27 that lock the rods in place. The outer ends of the arms 23 are split inwardly to the apertures that receive the guide rods 25 and the split ends of the arms are contracted by screws 28 thereby to clamp the guide rods 25 in place. The guide rods depend from the spider into the pan 10 to within a short distance of the bottom thereof, and vertically movable on each pair of guide rods is a food carrier 30. As will appear best from Figs. 4 and 5, each carrier 30 comprises a perforated bottom wall 31, a relatively shallow front wall 32, a deeper rear wall 33 and an end wall 34. At one end, the rear wall 33 terminates in a sleeve 35 that loosely embraces the outer guide rod 25 of the pair with which the carrier is associated, and the other rod 24 of said pair is loosely embraced by an eye in a lug 36 that extends from the upper edge of the wall 33. A stop 37 is carried by the lower end of each guide rod 25 to arrest downward movement of the corresponding food carrier, and said stop may consist of a standard cotter pin engaged through a transverse hole in the rod. This enables the stop to be readily removed when it is desired to withdraw the carrier from the guide rods and insures reassembly of the parts with equal facility, and since cotter pins are a standard article of merchandise, they can be readily and cheaply replaced in case of loss.

The pan 10 is provided with a relatively deep sump 40 shown as formed at its bottom with an outlet opening 41. As herein disclosed, the outlet opening of the sump is in the nature of a hollow externally threaded boss to which a cap 42 is applied, said cap serving to clamp a screen 43 to the end of the boss and being provided with a petcock 44.

The pan 10 occupies what may be termed the cooking compartment designated A, and the vertical limits of which are defined by the top plate or table 4 and by a hood 50 that is removably sustained by the frame of the machine with its peripheral flange 51 occupying a channel between the vertical flange of the top frame 2 and strips 53 that are connected to said flange with spacers 54 therebetween. It will be noted that said spacers are considerably narrower than, and are located at about the vertical centers of, said strips so that downwardly facing channels 55 are also provided. The hood is equipped with handles 56 to facilitate its removal and replacement and the hood tapers upwardly and inwardly to an outlet extension 57 over which is adapted to telescope a movable section 58 of a flue by which the gases from the machine are carried away.

Below the pan 10 is a heating compartment B whose bottom is formed by a partition 60 that is of the same size and shape as the bottom plate or base 3 and top plate or table 4, and it is suitably secured at its corners to the posts 1, said partition having an opening for the accommodation of the previously mentioned sump 40. The peripheral wall of the heating compartment B is formed by stationary plates 61 and movable damper plates 62, provided with respective openings 63 and 64 that are adapted to be brought into and out of register by the reciprocation of the damper plates by means of lugs 65 on the ends of the damper plates that extend through the adjacent openings of the stationary plates.

In the embodiment of the invention herein disclosed, the pan 10 is heated by a gas burner designated 68, shown as supported by the partition 60 and as having the usual mixer tube 69 that depends through an opening in said partition.

Between the partition 60 and the bottom plate or base 3 is the controls compartment C. A gas supply pipe 70 rises within the front portion of the compartment through an opening in the base 3 and leads to the mixing tube 69 of the burner 68, said pipe containing a control valve 71. A pilot burner 72 also receives its supply of gas from the pipe 70 under the control of a valve 73.

Supported in the front right hand corner of the controls compartment C, as viewed from the operator's position in front of the machine, is an electric motor 75, the upper end of whose shaft 76 has driving connection (through a reduction 77 and a shaft 78 gear shown conventionally at 77 and a shaft 78 including a coupler 79) with change-speed gearing 80 of any approved type whose operating handle is designated 81. Extending upwardly from the change-speed gearing 80, through apertures in the partition 60 and top plate 4, is a drive shaft 82 that has its upper end reduced at 83 (Fig. 7) and journaled in a bearing 84 supported within a fitting 85 that is suitably fastened to a member 86 secured within the adjacent corner of the top frame 2. The fitting 85 includes a depending sleeve 87 that surrounds the adjacent portion of the drive shaft 82 and has an external keyway 88 and an aperture 89. Slidable on the sleeve 87 is the elongated hub 90 of a latch element 91, shown as constructed of two sections that are adjustably connected together by screws 92 that are engaged through slots in one section and are threaded in the other; and the outer end of the latch element is provided with an aperture 95 for engagement, successively, with the studs 26 of the spider 22. Occupying a longitudinal kerf 96 in the bottom of the outer section of the latch element 91 is a stop lever 97 that is pivoted to the latch element at 98 and at its inner end has a lug 99. The outer end of the stop lever is depressed by a spring 97ª (shown in dotted lines in Fig. 7) so that normally said end occupies a position considerably below the bottom plane of the outer section of the latch element 91. By means presently to be explained, the latch element is lifted to withdraw its apertured outer end from a stud 26 of the spider, and the stop lever is swung on its pivot against the tension of the spring 97ª to retract its outer end to a position substantially within the underneath plane of the corresponding end of the latch element, these operations taking place preparatory to rotating the spider a distance equal to the angular spacing of adjacent arms thereof; and descent of the latch element, after release by its lifting means, is assured by a compression spring 100 that is confined between the upper end of the hub 90 of said element and the base of the fitting 85.

The latch element 91 is normally held in a given angular relation to the fitting 85 (in a position to properly cooperate with the studs 26 of the spider 22) by a spring pressed plunger 101, housed within a boss 102 on the hub of the latch element, and whose inner end is adapted to occupy the vertical keyway 88. By retracting the plunger 101, through the medium of its knob 103, the latch element may be adjusted angularly of the sleeve 87 and lifted against the tension of the spring 100 to align the plunger 101 with the aperture 89 and by then releasing the plunger so that its spring may project it into the aperture, the latch element 91 may be retained in ineffective position with its outer end swung beyond the reach of the arms 23 of the spider 22. This adjustment of the latch element to ineffective position is to permit removal of the spider, as will hereinafter more fully appear.

Clamped to the drive shaft 82 immediately below the sleeve 87 is the apertured split end of a thrower 105, such end being adapted to be contracted about the shaft in order to clamp it thereto by a screw 106, in accordance with common practice. Surrounding the shaft 82 and disposed between the latch element 91 and the thrower 105, and suitably secured to the latter for rotation therewith, is a ring-like member 107 that incorporates cams 108 and 109. As will presently appear from the description of the operation of the machine, the cam 108 serves to lift the latch element 91, and the cam 109 cooperates with the lug 99 of the stop lever to rock the lever and elevate its outer end to ineffective position.

Rising centrally of the machine through an aperture in the partition 60 and through the flue 15 is a fan shaft 110 that is shown as resting with its lower end upon a ball bearing 111 in a cup 112 that is mounted on the bottom plate or base 3 and as having its upper end portion journaled within a bearing 113 that is sustained, through spokes 114, from the top of the flue 15. An air impeller or fan 115 is secured to the upper end of the shaft 110 within the outlet extension 57 of the hood 50. Secured to the shaft 110 adjacent its lower end is a pulley 116 to which rotation at a relatively high speed is adapted to be transmitted through a belt 117 from a pulley on the lower end of the motor shaft 76.

The control compartment C is adapted to be closed by metal panels 118 that are removably supported with their top and bottom edges in channels of the frame, the upper channels being deep enough to permit the panels to be lifted by means of gripping portions or flanges 119 sufficiently to disengage their lower edges from the channels along the four sides of the base 3. The sides and rear of the cooking compartment A are preferably closed by panes of glass designated 120, removably held in place in a manner similar to that above described in connection with the panels 118. At the front of the machine the cooking compartment is desirably provided with relatively narrow, vertically arranged, stationary glass panes 122, and with sliding glass doors 123, as best shown in Fig. 2.

Resting of its own weight upon the bottom of the pan 10, so that it may be readily lifted therefrom, is an arcuate cam 125 (Figs. 1 and 2). The lower end of the cam has a depending portion 126 that engages within the top of the sump 40 for holding the cam against movement in a direction circumferentially of the pan, and arms 127 that spread from the lower edge of the cam near the high end thereof, engage the inner and outer curved walls of the pan so as to hold the cam in position in a direction radially of the pan.

Preparatory to placing the machine in operation, the attendant opens the doors 123 and fills the pan 10 with frying material or fat which, melted, assumes approximately the depth indicated by the line $a$ in Fig. 1. He then removes the front panel 118 of the controls compartment C and opens the valve 71 to supply gas to the burner 68 that is lighted by the pilot burner 72. He also closes the motor switch which sets the motor in operation and, by means of the handle 81, he may select the speed at which he desires to operate the machine, such speed depending upon the nature of the food that is to be cooked, some foods taking longer than others. When the frying material or liquor has attained cooking temperature, the operator, by means of a suitable implement, such as a fork or a pair of tongs, places a piece of food in the carrier that is immediately in front of him and which, as will be understood from the previous description, is elevated out of the frying liquor by the cam 125. As the shaft 82 rotates, the cam 108 will ride under the latch element 91 and lift it clear of the stud 26 wherewith it has been engaged and the cam 109 will override the lug 99 of the stop lever 97 and depress the inner end of the lever and retract the opposite end thereof to an ineffective position substantially within the plane of the underneath surface of the latch element. With the spider thus released, a guide rod 25, immediately below the corresponding arm 23, is engaged by the thrower 105 as the latter rotates with the shaft 82 and the spider is thereby moved one step which corresponds to the distance between adjacent arms thereof. Before the movement of the spider is completed, the cam 109 rides off the lug 99 of the stop lever, allowing the outer end of the lever to drop into the path of the approaching stud 26 and engagement of said stud with the lever occurs at the moment the thrower 105 withdraws from the guide rod 25. Thereafter the cam 108 rides from under the latch element 91, allowing said element to descend and engage its apertured end with the stud 26 thereby to lock the spider in position until subsequently released for its next actuation by the thrower 105. When the spider is thus advanced, the carrier into which the operator has placed a piece of food rides off of the high end of the cam 125 and drops into the frying liquor and the next carrier assumes its position on the high part of the cam to receive a piece of food. Obviously, the high part of the cam 125 may be long enough to sustain a number of carriers in elevated position, if desired.

It will be understood that by proper adjustment of the gas valve the frying liquor will be maintained at the required temperature to properly cook the food during its travel about the pan and when a carrier of food returns to loading position, the cooked food is removed from the carrier and a fresh piece of food is inserted.

In case any food is accidentally dropped into the pan or becomes dislodged from a carrier, it will be gradually propelled about the pan by the action of the carriers or by the flow of the liquor induced by such action until it drops into the sump 40; and settling to the bottom of the sump it is retained out of the zone of intense heat so as not to become burned and contaminate the body of frying liquor. While the machine is in operation, the air impeller or fan 115 will be rotated at a high rate of speed creating a draft upwardly through the flue wherewith the outlet extension of the hood communicates. By the forced draft thus created not only the cooking fumes will be carried away from the compartment A, but the products of combustion, or any odors from the lower portion of the machine, will be drawn up through the flue 15 and also outwardly through the vent openings 6 of the wall 5 between the latter and the surrounding flange 13 of the pan and escape with the cooking fumes through the outlet of the hood. The passage of the heated gases or, in the present case, the products of combustion through the vent openings 6 insures uniform heating of the pan 10 as such gases or products sweep outwardly from beneath the bottom wall and upwardly about the peripheral wall 11. Admission of secondary air to the burner 68 within the heating chamber B is controlled by adjustment of the damper plates 84.

When it is desired to clean the machine, as at the close of a day's operation, one or more of the panels 118 of the compartment C are removed, the gas and electricity are shut off, and the petcock 44 opened to drain the pan of its cooking liquor into a suitable vessel that is placed beneath the discharge of the sump 40 for the purpose of catching the liquor. The glass panes 120 are lifted out of the frame and after elevating the movable section 58 of the flue, the hood 50 is lifted off the frame. The latch element 91 is next placed in inoperative position, where it is held by the engagement of the plunger 101 with the aperture 89, as previously explained. and the spider 22 is then lifted clear of the flue 15 and over the fan 115. The pan 10 may, if desired, be removed from the machine for cleaning, although this is hardly necessary after the spider and food carriers have been taken out of the way and the cam 125 lifted from the pan. If any food or sediment of any sort occupies the sump 40, the cap 42 may be unscrewed and the screen 43 removed and the sump cleared.

With the spider removed from the machine, the stops 37 may be withdrawn from the guide rods 25 and the carriers slipped off said rods and thoroughly sterilized and the rods suitably cleaned, after which the carriers may be replaced and the stops engaged through the apertures of the rods 25. After cleaning, the parts are re-assembled for the next operation and when the panels and glass panes are replaced and the doors 123 are closed, the parts will be protected from dust and dirt and thus kept clean for an indefinite period of time.

Having thus described my invention, what I claim is:

1. In a machine of the class described, an open top pan, a flue rising through the pan, heating means situated adjacent the bottom of the pan, and power driven air impelling means situated above the flue for creating a forced draft upwardly through the flue and across the pan.

2. In a machine of the class described, a top plate having an opening, a pan occupying said opening, the space beneath the pan being vented to the space above the top plate adjacent the periphery of the pan, a flue rising through the pan, heating means situated in proximity to the bottom of the pan, and means for creating a forced draft upwardly through the flue and about the pan.

3. In a machine of the class described, a top plate having an opening surrounded by an upstanding wall, a pan occupying said opening and provided with a ledge arranged to rest upon said wall, the space beneath the pan being vented to the space above the top plate adjacent the joint between said ledge and wall, a flue rising through the pan, heating means situated in proximity to the bottom of the pan, and means for creating a forced draft upwardly through the flue and about the pan.

4. In a machine of the class described, a top plate having an opening, a pan occupying said opening, the space beneath the pan being vented to the space above the top plate adjacent the peripheral portion of the pan, a flue rising through the pan, a hood spaced above the pan and having a discharge opening, a combustion device in the space below the pan, means for controlling the supply of air to said space, enclosing walls between the edge portions of the top plate and hood, and means for creating a forced draft upwardly through the flue and through the discharge opening of the hood and about the pan.

5. In a machine of the class described, a top plate having an opening, a pan occupying said opening, the space beneath the pan being vented to the space above the top plate adjacent the peripheral portion of the pan, a flue rising through the pan, a hood spaced above the pan and having a discharge opening, a combustion device in the space below the pan, means for controlling the supply of air to said space, enclosing walls between the edge portions of the top plate and hood, an air impeller situated within the discharge opening of the hood for creating a forced draft upwardly through the flue and about the pan, and further means for actuating said air impeller.

6. In a machine of the class described, an open top pan, a flue rising through the pan in spaced relation to the peripheral wall thereof, heating means for the pan, a hood spaced above the pan and having an outlet for receiving the discharge of the flue and communicating freely with the space above the pan, and an air impeller in operative relation to the outlet of the hood.

7. In a machine of the class described, a top member having an opening, a pan occupying said opening, a flue rising though the pan in spaced relation to the peripheral wall thereof, there being vent openings about the pan and an enclosed space beneath the pan, heating means in said space, means for creating a forced draft upwardly through the flue and through said vent openings, and means for controlling the admission of air to the space beneath the pan.

8. In a machine of the class described, a frame including a top plate having an opening surrounded by an upstanding wall, a pan provided with an outwardly extending ledge adjacent its top arranged to rest upon said wall with the body of the pan spaced from the wall, a plate spaced below the top plate, a peripheral wall enclosing the space between said plates thereby to provide a burner compartment beneath the pan, said compartment being vented adjacent the aforesaid ledge, a combustion device within the burner compartment, control means for governing the admission of air to said compartment, a flue rising through the pan, a hood having an outlet opening spaced above the pan, and means for creating a forced draft upwardly through said outlet opening.

9. In a machine of the class described, a frame including a top plate having an opening surrounded by an upstanding cylindrical wall, said wall having vent openings adjacent its upper edge, an annular pan provided with an outwardly extending ledge arranged to rest upon said cylindrical wall, a plate spaced below the top plate, a peripheral wall enclosing the space between said plates thereby to provide a burner compartment beneath the pan, a combustion device within said compartment, control means for governing the admission of air to said compartment, a flue rising through the pan, a hood having an outlet opening spaced above the pan, and means for creating a forced draft upwardly through the flue and through the aforesaid vent openings and through the outlet of the hood.

10. In a machine of the class described, a frame including a top plate having an opening surrounded by an upstanding wall, said wall having vent openings adjacent its upper edge, a pan provided with an outwardly extending ledge adjacent its top arranged to rest upon said wall with the body of the pan spaced from the wall, a plate spaced below the top plate to provide a burner compartment beneath the pan, a peripheral wall enclosing said space, said wall having air admitting openings, dampers for controlling the admission of air through said openings, a combustion device in said burner compartment, a flue rising through the pan, a hood supported above the pan and having an outlet opening, and means for creating a forced draft upwardly through the flue and through the aforesaid vent openings and through the outlet opening of the hood.

11. In a machine of the class described, the combination of an annular pan adapted to contain frying liquor, means for heating the same, a flue rising through the pan centrally thereof, a spider supported for rotation substantially on the axis of said flue, guides depending from the spider into the pan, food carriers slidable on said guides, a cam situated within the pan for engagement by the carriers and serving to elevate the carriers successively as they are propelled about the pan, and means for imparting rotation to the spider.

12. In a machine of the class described, the combination of an annular pan adapted to contain frying liquor, means for heating the same, a flue rising through the pan centrally thereof, a spider rotatably supported by the flue, pairs of guide rods depending from the spider into the pan, a food carrier slidable on each pair of said rods, means for rotating the spider, and means for elevating the carriers on the guide rods as they successively arrive at a given location.

13. In a machine of the class described, the combination of an annular pan adapted to contain frying liquor, means for heating the same, a flue rising through the pan centrally thereof, a spider surrounding the flue above the pan and removably and rotatably supported by the flue, guides depending from the spider into the pan, food carriers slidable on said guides, means for elevating the carriers successively as they arrive at a given location thereby to move the food from the frying liquor, and stop means for limiting the descent of the carriers along the guides, said stop means being adapted to be rendered ineffective whereby the carriers may be removed from the guides.

14. In a machine of the class described, the combination of a pan adapted to contain frying liquor, means for heating the same, a spider supported for rotation in a substantially horizontal plane above the pan, a series of food carriers sustained by the spider so as to be submerged in the liquor in the pan, and mechanism for imparting a step-by-step movement to the spider.

15. In a machine of the class described, the combination of a pan adapted to contain frying liquor, means for heating the same, a spider supported for rotation in a substantially horizontal plane above the pan, a series of food carriers sustained by the spider so as to be submerged in the liquor, and mechanism for imparting a step-by-step movement to the spider and for locking the spider in position between movements thereof.

16. In a machine of the class described, the combination of a pan adapted to contain frying liquor, means for heating the same, a spider supported for rotation in a substantially horizontal plane above the pan, a series of food carriers sustained by the spider so as to be submerged in the liquor, and mechanism for imparting a step-by-step movement to the spider, said mechanism including a stop for preventing overthrow of the spider and a latch element for locking the spider in position between movements thereof.

17. In a machine of the class described, the combination of a pan adapted to contain frying liquor, means for heating the same, a spider supported for rotation in a substantially horizontal plane above the pan, a series of food carriers sustained by the spider so as to be submerged in the liquor, the spider having a series of peripheral abutments and studs spaced apart circumferentially thereof, and mechanism for imparting a step-by-step movement to the spider and comprising a vertical drive shaft adjacent the spider, a thrower carried thereby for engagement with successive abutments as the drive shaft rotates, a latch element movable vertically of said shaft for holding engagement with the successive studs of the spider, a stop movably carried by the latch element for engagement by the studs of the spider to prevent overthrow thereof, and cams rotatable with the thrower for moving the latch element to withdraw it and said stop from the path of the studs in advance of the movement of the spider and arranged to release the stop so as to render the same effective at about the conclusion of the spider's movement and thereafter to release the latch element and render it effective.

18. In a machine of the class described, the combination of a pan adapted to contain frying liquor, means for heating the same, a spider removably supported for rotation in a substantially horizontal plane above the pan, a series of food carriers sustained by the spider so as to be submerged in the liquor in the pan, the spider having a series of peripheral abutments and studs spaced apart circumferentially thereof, and mechanism for imparting a step-by-step movement to the spider, said mechanism comprising a vertical drive shaft adjacent the spider, a thrower carried thereby for engagement with the successive abutments of the spider as the drive shaft rotates, a latch element normally overhanging the peripheral portion of the spider and movable vertically of said shaft for holding engagement with the successive studs of the spider, a stop movably carried by the latch element for engagement by the studs of the spider to prevent overthrow thereof, and cams rotatable with the thrower for lifting the latch element to withdraw it and said stop vertically from the path of the studs in advance of the movement of the spider and arranged to release the stop so as to render the same effective at about the conclusion of the spider's movement and thereafter to release the latch element and render it effective, the latch element being shiftable to an ineffective position laterally of the spider to permit removal of the spider.

19. In a machine of the class described, the combination of an open top pan, a conveyor element movably supported above the pan, food carriers suspended from said element and adapted to be submerged in frying liquor contained in the pan, heating means associated with the pan for heating the liquor therein, mechanism for imparting movement to the conveyor element, a prime mover, and selective change-speed gearing through which the prime mover may be caused to drive said mechanism at different selected speeds.

20. In a machine of the class described, the combination of a pan having an outwardly extending ledge and a flange depending from the outer edge thereof, a support for the pan comprising an upstanding wall on which the ledge is adapted to bear, and cooperating positioning members on the support and pan for locating the pan in a definite relation to the support, the space beneath the pan being vented adjacent the region of contact between the ledge and wall, and means for heating the pan.

21. In a machine of the class described, a frame structure comprising uprights, a hood surmounting said uprights and having an outlet opening, a pan support sustained by the uprights a substantial distance below the hood, said support having a relatively large opening, a pan occupying said opening and having a flue extending upwardly therethrough in discharging relation to the outlet opening of the hood, heating means below the pan, a base supported by the uprights a material distance below the pan support, a bearing on the base in vertical alignment with the axis of the flue, a shaft having its lower end journaled in said bearing and extending upwardly through the flue, a bearing adjacent the top of the flue wherein the upper end portion of the shaft is journaled, an air impeller carried by the shaft for inducing an upward draft through the outlet opening of the hood, a prime mover supported by the frame above the base, and driving connections between the prime mover and said shaft.

22. In a machine of the class described, a frame structure comprising uprights, a hood surmounting said uprights and having an outlet opening, a pan support sustained by the uprights a substantial distance below the hood, said support having a relatively large opening, an annular pan supported within said opening and having a central flue in vertical alignment with the outlet opening of the hood, heating means below the pan, a base supported by the uprights a substantial distance below the pan and having a bearing in vertical alignment with the axes of the flue and the outlet opening of the hood, a shaft having its lower end journaled in said bearing and extending upwardly through the flue, a bearing adjacent the top of the flue wherein the upper end portion of the shaft is journaled, an air impeller carried by the shaft for inducing an upward draft through the outlet opening of the hood, a conveying element supported for rotation about the axis of the flue and above the pan, food carriers depending from said conveying element into the pan, mechanism for imparting movement to said conveying element, a prime mover supported by the frame above the base, and driving connections between said prime mover and both said mechanism and the beforementioned shaft.

23. In a machine of the class described, a frame structure comprising uprights, a hood surmounting said uprights and having an outlet opening, a top plate supported by the uprights a substantial distance below the hood and defining the bottom of a cooking compartment, said plate having a relatively large opening, an annular pan occupying the opening in the top plate and having a flue below the outlet opening of the hood, a partition incorporated in the frame a distance below the top plate and defining the bottom of a burner compartment, a combustion device in the last mentioned compartment beneath the pan, a base supported by the frame a substantial distance below the partition and forming the bottom of a controls compartment, a conveyor element movably supported above the pan, food carriers depending therefrom into the pan, mechanism for imparting movement to the conveyor element, an air impeller in operative relation to the outlet opening of the hood, a prime mover for operating the aforesaid mechanism and the air impeller, control means within the controls compartment for varying the speed of the aforesaid mechanism, means within said controls compartment for regulating the combustion device, further means in the controls compartment for controlling the operation of the prime mover, panels carried by the frame and constituting the peripheral wall of the controls compartment, at least one of which panels is removably supported by the frame, panes of transparent material supported by the frame in a position to form the peripheral wall of the cooking compartment, certain of said panes being movable to form doors through which access may be had to said compartment, walls supported by the frame and enclosing the burner compartment, at least one of said walls having openings, and damper means for controlling the admission of air through said openings.

FULVIO DE FAZI.